United States Patent
Nagasawa

(10) Patent No.: US 12,263,886 B2
(45) Date of Patent: Apr. 1, 2025

(54) FRONT FRAME STRUCTURE FOR ELECTRIC VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/430,039

(22) Filed: Feb. 1, 2024

(65) Prior Publication Data

US 2024/0278839 A1 Aug. 22, 2024

(30) Foreign Application Priority Data

Feb. 21, 2023 (JP) .................................. 2023-025425

(51) Int. Cl.
- *B62D 21/15* (2006.01)
- *B60K 1/00* (2006.01)
- *B60R 19/24* (2006.01)

(52) U.S. Cl.
CPC .............. *B62D 21/152* (2013.01); *B60K 1/00* (2013.01); *B60R 19/24* (2013.01)

(58) Field of Classification Search
CPC .... B62D 21/11; B62D 21/152; B62D 21/155; B62D 25/082; B60R 19/24; B60R 19/26; B60R 19/34; B60K 1/00
See application file for complete search history.

(56) References Cited

U.S. PATENT DOCUMENTS

| | | | | |
|---|---|---|---|---|
| 4,428,599 A | * | 1/1984 | Jahnle | B62D 23/00 296/184.1 |
| 4,431,221 A | * | 2/1984 | Jahnle | B62D 21/152 293/122 |
| 5,579,699 A | * | 12/1996 | Dannawi | B61F 1/08 293/133 |
| 7,296,824 B2 | * | 11/2007 | Yasui | B62D 25/04 296/203.02 |
| 7,469,956 B2 | * | 12/2008 | Yasuhara | B62D 21/152 293/133 |

(Continued)

FOREIGN PATENT DOCUMENTS

JP 2006168537 A * 6/2006
JP 2012-201284 A 10/2012

*Primary Examiner* — Laura Freedman
(74) *Attorney, Agent, or Firm* — Smith, Gambrell & Russell, LLP

(57) ABSTRACT

A front frame structure for an electric vehicle includes front side frames disposed in extra spaces between left and right side walls in a vehicle width direction of a motor room and side surfaces of a power control unit; a frame-shaped rigid member disposed in an extra space in a front portion of the motor room; left and right impact absorbing members coupled to a front surface of the frame-shaped rigid member at positions directly facing the front side frames; a bumper beam coupling the impact absorbing members; a lower frame disposed in a lower portion of the motor room; and upper reinforcements coupled to upper surfaces of the front side frames. Outer side surfaces in the vehicle width direction of the upper reinforcements gradually protrude outward in the vehicle width direction from front ends toward rear ends of the upper reinforcements in a front-rear direction of a vehicle body.

8 Claims, 5 Drawing Sheets

(56) References Cited

U.S. PATENT DOCUMENTS

| | | | | |
|---|---|---|---|---|
| 9,676,417 B2* | 6/2017 | Yamada | ............... | B62D 21/152 |
| 11,661,021 B2* | 5/2023 | Iwamoto | ................. | B60R 19/18 |
| | | | | 293/102 |
| 2021/0331640 A1* | 10/2021 | Iwamoto | ................. | B60R 19/26 |
| 2024/0278838 A1* | 8/2024 | Nagasawa | ................ | B60K 1/00 |
| 2024/0278843 A1* | 8/2024 | Nagasawa | ............ | B62D 25/082 |
| 2024/0278847 A1* | 8/2024 | Nagasawa | ............ | B62D 25/085 |
| 2024/0278850 A1* | 8/2024 | Nagasawa | .............. | B62D 21/11 |

* cited by examiner

FRONT FRAME STRUCTURE FOR ELECTRIC VEHICLE

CROSS-REFERENCE TO RELATED APPLICATIONS

The present application claims priority from Japanese Patent Application No. 2023-025425 filed on Feb. 21, 2023, the entire contents of which are hereby incorporated by reference.

BACKGROUND

Technical Field

The disclosure relates to a front frame structure for an electric vehicle.

Related Art

A power unit including an electric motor is mounted in a motor room provided in a front portion of an electric vehicle. In an event of a full-wrap frontal collision or a small-overlap frontal collision, it is almost impossible for the power unit to absorb impact energy because the power unit is a rigid body. Since the power unit of the electric vehicle is smaller in size than a power unit of a reciprocating engine, a control unit including high-voltage members such as an inverter and a direct current-direct current (DC/DC) converter is often mounted above the power unit.

If the power unit, which is a rigid body, is retreated by an impact in an event of a frontal collision, a cabin may be deformed. The control unit, which is a high-voltage member, may be crushed by the impact in the event of the frontal collision. Thus, in the event of the frontal collision, the impact energy in the event of the frontal collision is to be absorbed at least in front of the power control unit in which the power unit and the control unit are integrated.

The electric vehicle uses a large-capacity battery to ensure a sufficient cruising distance. In many cases, an entire space under a floor is ensured as a battery chamber, and a battery is accommodated in the battery chamber. Thus, in an event of a frontal collision, deformation of the cabin and the battery chamber is to be reduced for effective protection.

For example, Japanese Unexamined Patent Application Publication (JP-A) No. 2012-201284 discloses an electric vehicle in which one main frame extending in a front-rear direction of a vehicle body is disposed at the center in a vehicle width direction of the vehicle body, and a battery is accommodated in the main frame. In the electric vehicle disclosed in JP-A No. 2012-201284, the battery is not accommodated in a portion of the main frame extending forward with respect to front wheels, and impact energy is absorbed by the portion extending forward with respect to the front wheels in an event of a frontal collision.

SUMMARY

An aspect of the disclosure provides a front frame structure for an electric vehicle. The front frame structure includes front side frames, a frame-shaped rigid member, left and right impact absorbing members, a bumper beam, a lower frame, and upper reinforcements. The front side frames are disposed respectively in extra spaces between left and right side walls in a vehicle width direction of a motor room and side surfaces of a power control unit of the electric vehicle. The frame-shaped rigid member is disposed in an extra space in a front portion of the motor room. The left and right impact absorbing members are coupled to a front surface of the frame-shaped rigid member at positions directly facing the front side frames. The bumper beam couples the left and right impact absorbing members. The lower frame is disposed in a lower portion of the motor room. Both sides in the vehicle width direction of the lower frame are supported by the front side frames. The power control unit including an electric motor is supported on a rear portion of the lower frame. The upper reinforcements are coupled to upper surfaces of the front side frames. Outer side surfaces in the vehicle width direction of the upper reinforcements gradually protrude outward in the vehicle width direction from front ends toward rear ends of the upper reinforcements in a front-rear direction of a vehicle body of the electric vehicle.

DETAILED DESCRIPTION

The electric vehicle disclosed in JP-A No. 2012-201284 is originally designed as a dedicated frame structure. Thus, cost may increase as compared with a frame structure for an electric vehicle designed based on a front frame structure that is used for a vehicle in which a conventional reciprocating engine is mounted.

When impact energy in an event of a frontal collision is to be absorbed by a front end portion of the main frame, a crush stroke (an expected amount of plastic deformation in a collision direction in the event of the frontal collision) of the main frame is set to be forward with respect to a power unit. However, when the crush stroke is to be ensured by the deformation of the main frame, a front overhang amount to the front with respect to the power unit increases, and design may be impaired.

In JP-A No. 2012-201284, two auxiliary frames extend from the vicinity of front-wheel axle positions of the main frame to the front of the vehicle body. Distal ends of the left and right auxiliary frames are coupled by a bumper beam to receive an impact load in an event of a frontal collision.

When an electric vehicle collides with an obstacle in a small-overlap frontal collision, it is difficult to sufficiently absorb impact energy because the obstacle collides with an outer side of an auxiliary frame. A battery module accommodated in the battery chamber of the electric vehicle is a heavy object. Thus, in the event of the small-overlap frontal collision, an inertial force of the electric vehicle cannot be sufficiently attenuated in an initial stage of the collision, and it may be difficult to sufficiently protect the cabin or the battery chamber.

It is desirable to provide a front frame structure for an electric vehicle. The front frame structure can be designed based on a front frame structure that is used for a vehicle in which a conventional reciprocating engine is mounted, and can effectively protect a power control unit, and a cabin or a battery chamber from an impact load in a full-wrap frontal collision and a small-overlap frontal collision without impairing design.

Figure 1:
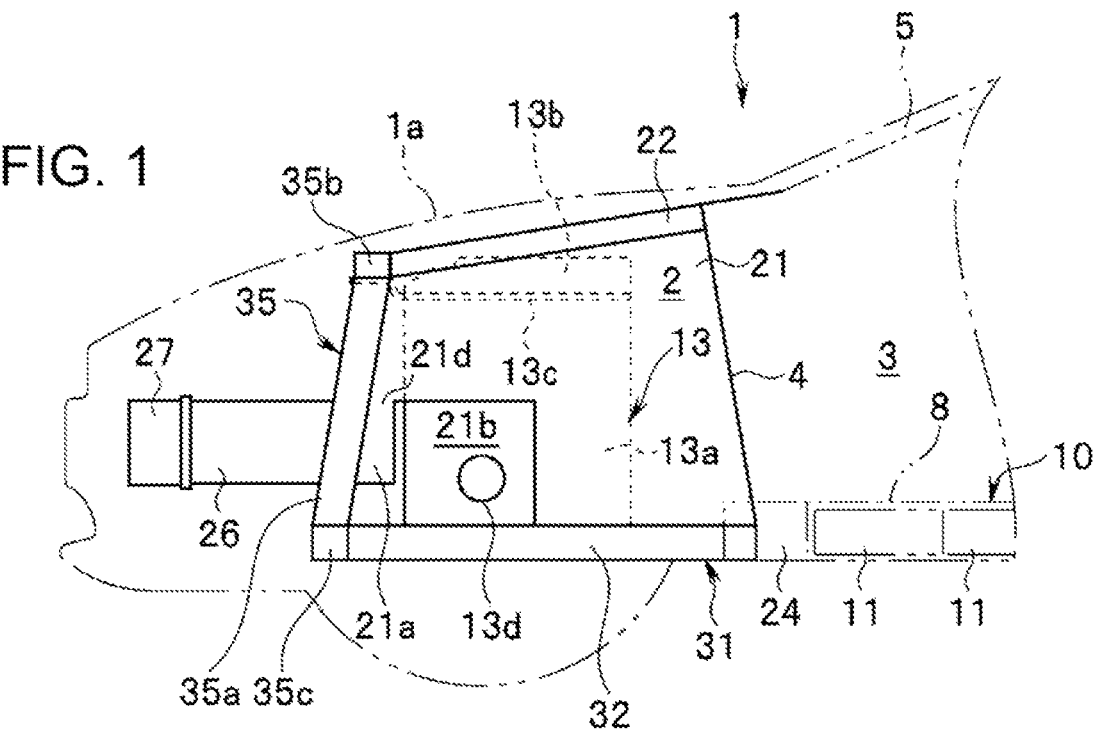
FIG. 1 is a side view illustrating a front frame structure.
Figure 2:
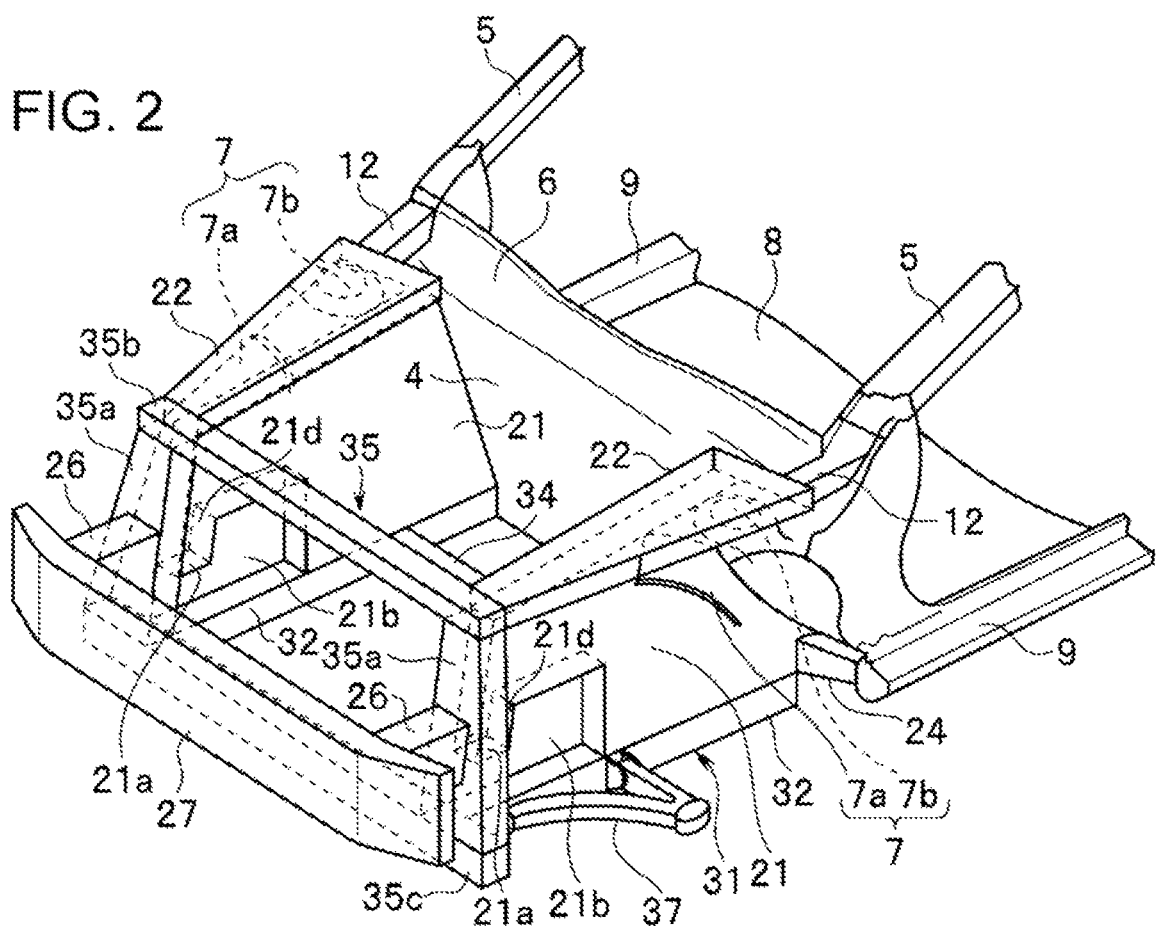
FIG. 2 is a perspective view illustrating the front frame structure.

An embodiment of the disclosure will be described below with reference to the drawings. FIGS. 1 and 2 illustrate a frame structure of a vehicle body front portion 1 in an electric vehicle. A motor room 2 is provided in the vehicle body front portion 1. An upper opening of the motor room 2 is covered with a front hood 1a that can be opened and closed.

A cabin 3 is provided in rear of the motor room 2. The motor room 2 and the cabin 3 are partitioned via a toe board 4 extending in a vehicle width direction. In the following description, when a term "weld-join" is used, the joining method is performed by welding using a welding method typified by spot welding unless otherwise specified.

Both left and right side edges of the toe board 4 are weld-joined to a pair of opposite front pillars 5. An upper end edge of the toe board 4 is weld-joined to a bulkhead 6 extending in the vehicle width direction. A pair of wheel aprons 7 opposite to each other are formed at front portions on both sides of the toe board 4. A lower portion of the toe board 4 is continuous with a front end edge of a floor panel 8. The floor panel 8 corresponds to a floor surface of the cabin 3.

Both sides in the vehicle width direction of the floor panel 8 are weld-joined to a pair of side sills 9. The side sills 9 extend in a front-rear direction of the vehicle body on left and right side portions of the floor panel 8. Front portions of the side sills 9 are weld-joined to lower end portions of the front pillars 5. Upper portions of the left and right front pillars 5 extend upward of the vehicle body in a state of being inclined rearward, and are weld-joined to front end portions of roof side rails (not illustrated).

A battery chamber 10 is provided substantially entirely under a lower surface of the floor panel 8. The battery chamber 10 is a sealed container. Multiple battery modules 11 are disposed in the battery chamber 10. Each of the battery modules 11 stores electric energy for driving a traveling electric motor.

The pair of wheel aprons 7 opposite to each other form side walls of the motor room 2. Each of the wheel aprons 7 is provided with an arch-shaped wheel house 7a that covers an upper side of a front wheel Wf (see FIG. 5A), a suspension tower 7b that supports an upper portion of a strut of a suspension (not illustrated) that suspends the front wheel Wf, and the like. The suspension tower 7b is disposed at a relatively rear portion of the motor room 2, and protrudes inward in the vehicle width direction of the motor room 2.

An upper end portion of the wheel apron 7 is weld-joined to an upper side frame 12. A rear end of the upper side frame 12 is weld-joined to the front pillar 5. An outer side in the vehicle width direction of the suspension tower 7b is weld-joined to the upper side frame 12. The left and right front pillars 5 are weld-joined to both end portions of the bulkhead 6. Both the end portions of the bulkhead 6 are weld-joined to the left and right wheel aprons 7. The suspension tower 7b may be a strut tower.

A front frame structure of an electric vehicle is designed based on a front frame structure of a vehicle in which a conventional reciprocating engine is mounted. A power control unit including an electric motor and a transmission is smaller in size than a power unit of a reciprocating engine. Thus, many electric vehicles adopt a structure in which a control unit 13b including high-voltage members such as an inverter and a DC/DC converter is mounted above a power unit 13a. The control unit 13b is fixed on a bracket 13c, and the bracket 13c is fixed on the power unit 13a.

Thus, in the electric vehicles, a proportion of a volume (volume occupancy) of a power control unit 13 in which the power unit 13a and the control unit 13b are integrated in the motor room 2 is lower than a volume occupancy of a power unit using a reciprocating engine as a driving source in an engine room having the same volume as the motor room 2. As a result, in the motor room 2, extra spaces are formed between left and right side walls of the motor room 2 and side surfaces of the power control unit 13 facing the left and right side walls. An extra space is also formed in front of the power control unit 13.

In the present embodiment, a framework of the front frame structure is reconstructed by utilizing the extra spaces generated in the motor room 2. With this reconstruction, impact energy in an event of a full-wrap frontal collision or a small-overlap frontal collision can be efficiently absorbed in front of the power control unit 13.

First, front side frames 21 are reconstructed. The reconstructed front side frames 21 are disposed in the extra spaces formed between side surfaces in the vehicle width direction of the power control unit 13 and inner surfaces in the vehicle width direction of the wheel aprons 7 in the motor room 2. The front side frames 21 extend in the front-rear direction of the vehicle body.

Rear portions of the front side frames 21 are weld-joined to both portions in the vehicle width direction of a toe board cross member (not illustrated) that reinforces the toe board 4. Front surfaces of the front side frames 21 are joined to vertical frames 35a provided in a front rigid frame 35. The configuration of the front rigid frame 35 will be described later.

Each of the front side frames 21 is formed in a wall shape having substantially a dimension in a height direction from a bottom portion to an upper portion of the motor room 2. The front side frame 21 has a hollow cross section. For example, the front side frame 21 has a dimension from the bottom portion of the motor room 2 to a height substantially the same as the height of the upper side frame 12 in the height direction of the vehicle body. Rear ends of the front side frames 21 are weld-joined to both ends of the toe board cross member (not illustrated) of the toe board 4. Outer sides in the vehicle width direction of the rear portions of the front side frames 21 are weld-joined to torque boxes 24. The torque boxes 24 are weld-joined to inner surfaces in the vehicle width direction of the front portions of the side sills 9.

A lower end of a front end lower portion 21a of each of the left and right front side frames 21 is separated from a lower side frame 32 (described later). A space 21b is formed behind the front end lower portion 21a, and a space formed below the front end lower portion 21a communicates with the space 21b. The space 21b has a rectangular shape whose lower side is opened.

The front surface of the front side frame 21 is coupled to a rear surface of the vertical frame 35a. A rear end of a crash box 26 serving as an impact absorbing member is coupled to a front surface of the vertical frame 35a at a position substantially directly facing the front end lower portion 21a of the front side frame 21, that is, at a position lower than the center in an up-down direction of the vertical frame 35a. Distal ends of the left and right crash boxes 26 are coupled to each other via a bumper beam 27 extending in the vehicle width direction. The crash box 26 is provided at the position of the center of gravity in the up-down direction of the electric vehicle. The width in the vehicle width direction of the crash box 26 is the same as the width in the vehicle width direction of the front end lower portion 21a.

Figure 3:
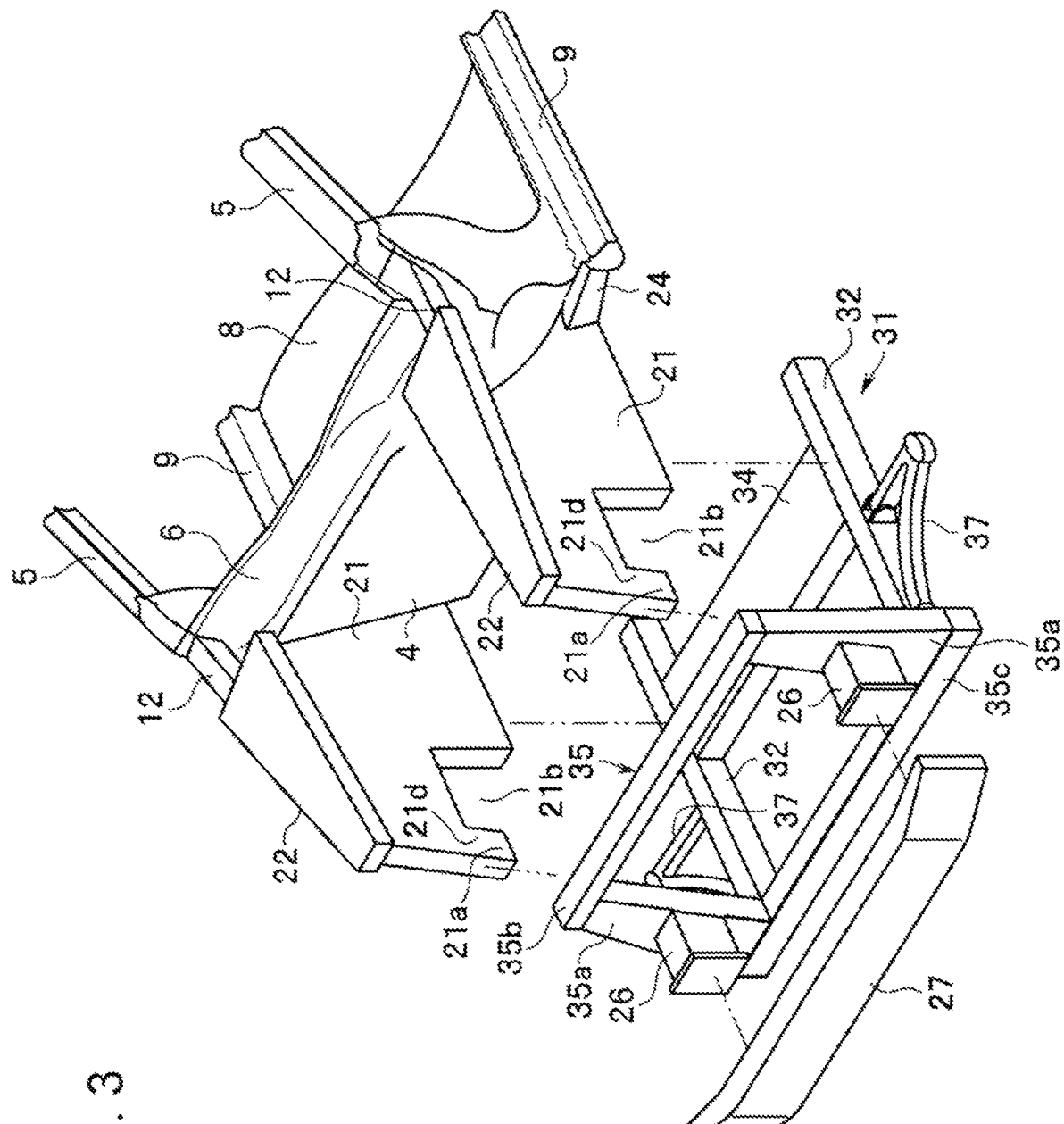
FIG. 3 is an exploded perspective view illustrating the front frame structure.

In contrast, a cradle 31 serving as a lower frame is disposed on a bottom surface of the motor room 2. As illustrated in FIG. 3, the cradle 31 includes a pair of left and right lower side frames 32, a rear cross member 34, and a front cross member 35c that also serves as a component of the front rigid frame 35 (described later). The lower side frames 32 and the rear and front cross members 34 and 35c each are formed in a hollow rectangular shape in cross section.

The distance between the left and right lower side frames 32 is set to be the same as the distance between the left and right front side frames 21. The front cross member 35c is weld-joined to front ends of the left and right lower side frames 32. Both ends of the rear cross member 34 are weld-joined to rear portions of the left and right lower side frames 32 on inner sides in the vehicle width direction.

The rear cross member 34 is formed to be slightly wide in the front-rear direction. The power control unit 13 is supported on the rear cross member 34 via a motor mount (not illustrated). An axle shaft 13d extends from the transmission provided in the power control unit 13 to both sides in the vehicle width direction. The width in the vehicle width direction of each of the lower side frames 32 is the same as the width in the vehicle width direction of the front side frame 21.

Lower surfaces of the front side frames 21 are coupled onto the left and right lower side frames 32, and the lower ends of the front end lower portions 21a are separated from the front side frames 21. The axle shaft 13d of the power unit 13a provided in the power control unit 13 penetrates through the spaces 21b and protrudes outward in the vehicle width direction. The height of upper surfaces of the spaces 21b substantially coincides with the height of upper surfaces of the crash boxes 26.

The front rigid frame 35 serving as a frame-shaped rigid member is weld-joined to the front surfaces of the front side frames 21 and the front ends of the lower side frames 32 provided in the cradle 31.

The front rigid frame 35 is disposed in the extra space formed in front of the power control unit 13 disposed in the motor room 2. The front rigid frame 35 includes the pair of left and right vertical frames 35a, an upper cross member 35b, and the front cross member 35c.

The front cross member 35c is weld-joined to the front ends of the lower side frames 32 provided in the above-described cradle 31, and also serves as a component of the cradle 31. Both end portions of the front cross member 35c protrude outward in the vehicle width direction with respect to the lower side frames 32 within a range not exceeding the vehicle body width.

The vertical frames 35a each are a hollow quadrangular prism. An inner side surface in the vehicle-width direction of the vertical frame 35a extends along an inner side surface in the vehicle width direction of the front surface of the front side frame 21. An outer side surface in the vehicle width direction of the vertical frame 35a is inclined inward in the vehicle width direction from a base to an upper side. Thus, the vertical frame 35a is formed in a trapezoidal shape whose base is wide in a front view.

An outer end portion in the width direction of a bottom surface of the vertical frame 35a substantially coincides with the end portion of the front cross member 35c. Thus, an end portion of the front side frame 21 and an outer lower portion in the vehicle width direction of the vertical frame 35a protrude forward of the front wheel Wf. Since the vertical frame 35a is a trapezoidal quadrangular prism, the weight can be reduced as compared with a rectangular-parallelepiped shape.

The vertical frame 35a is inclined rearward of the vehicle body. Thus, the vertical frame 35a is weld-joined to the front surface of the front side frame 21 in an inclined state. Since the vertical frame 35a is inclined rearward of the vehicle body, the entire front rigid frame 35 is inclined rearward of the vehicle body.

The front end lower portion 21a of the front side frame 21 has a narrow portion 21d on an upper end side of the space 21b by the inclination of the vertical frame 35a. In an event of a frontal collision, an impact load is concentrated on a ridge portion of the space 21b forming the narrow portion 21d, and a trigger for deformation is given. Thus, the front end lower portion 21a serves as a fragile portion.

Upper ends of the left and right vertical frames 35a are weld-joined to both ends of the upper cross member 35b. In a front portion of the motor room 2, a frame-shaped structure is formed by the front rigid frame 35. A front portion of the bracket 13c that fixes the control unit 13b is fixed to the upper cross member 35b.

In contrast, an upper reinforcement 22 is weld-joined to an upper surface of the front side frame 21. The upper reinforcement 22 is a hollow quadrangular prism formed in a trapezoidal shape in a plan view. The upper reinforcement 22 is disposed from a distal end to the rear end of the front side frame 21. An inner side surface in the vehicle width direction of the upper reinforcement 22 extends along an inner side surface in the vehicle width direction of the front side frame 21. In contrast, an outer side surface in the vehicle width direction of the upper reinforcement 22 gradually extends outward in the vehicle width direction from a front end toward a rear end of the upper reinforcement 22 in the front-rear direction of the vehicle body so that the width of the upper reinforcement 22 increases.

A front surface of the upper reinforcement 22 is coupled to a rear surface of the upper cross member 35b. The rear end of the upper reinforcement 22 protrudes outward in the vehicle width direction within a range not exceeding the vehicle body width (see FIGS. 5A to 5C). An outer side in the vehicle width direction of the upper reinforcement 22 is weld-joined to the upper side frame 12.

An upper surface of the suspension tower 7b is weld-joined to a bottom surface of the upper reinforcement 22. Since the upper surface of the suspension tower 7b is weld-joined to the bottom surface of the upper reinforcement 22, the rigidity of the suspension tower 7b is increased. Since the upper side frame 12 is weld-joined to the upper reinforcement 22, the rigidity of the upper side frame 12 is also increased.

Bottom surfaces of the left and right front side frames 21 are coupled to upper surfaces of the left and right lower side frames 32 provided in the cradle 31 via fastening members such as bolts. Rear end portions of the left and right lower side frames 32 on the outer sides in the vehicle width direction are coupled to the torque boxes 24 via fastening members such as bolts. Rear ends of the left and right lower side frames 32 are coupled to a floor cross member (not illustrated). The floor cross member is weld-joined to the toe board 4.

Figure 4A:
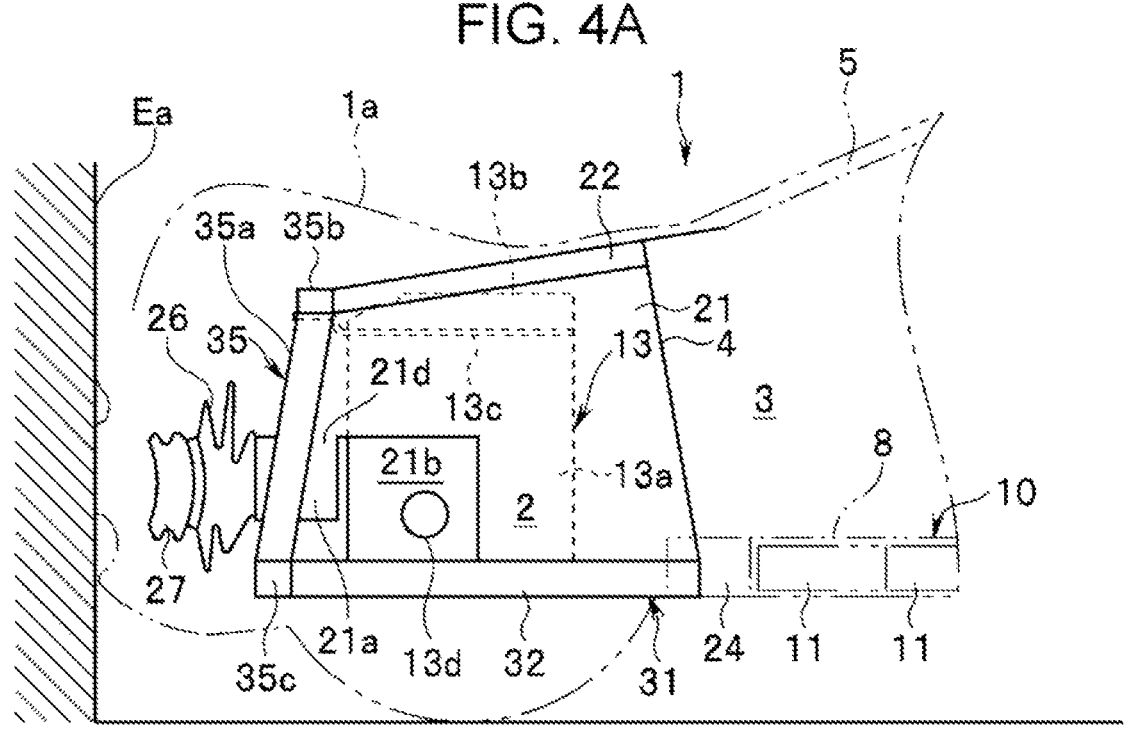
FIG. 4A is a side view illustrating a behavior of a front frame from an initial stage of a full-wrap frontal collision to a middle stage of the collision.
Figure 4B:
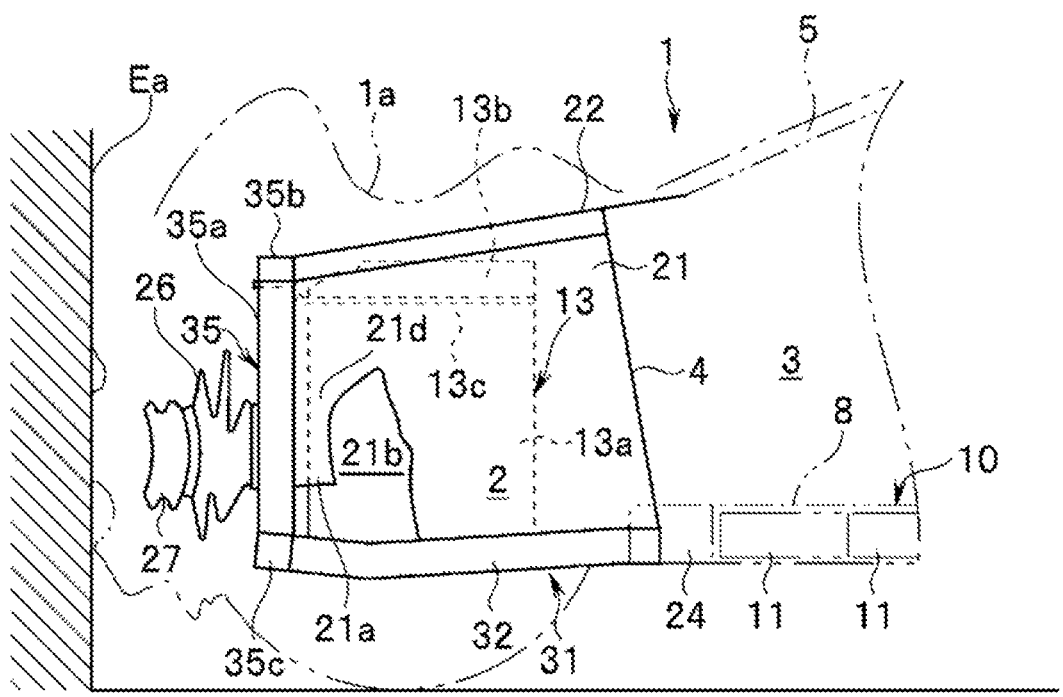
FIG. 4B is a side view illustrating a behavior of the front frame in a final stage of the full-wrap frontal collision.

As illustrated in FIGS. 4A and 4B, the front rigid frame 35 faces a front portion of the power control unit 13. The front rigid frame 35 is a rigid body. The upper reinforcement 22 is a hollow quadrangular prism having a trapezoidal shape that is widened toward a rear portion in a plan view, and has high rigidity against an impact load from the front. Since the front side frame 21 is formed in a wall shape, the rear portion of the front side frame 21 is less likely to be crushed. As a result, when the electric vehicle collides with a three-dimensional obstacle Ea (see FIG. 4A and FIG. 4B) in a full-wrap frontal collision, the front end lower portion 21a of the front side frame 21 and the portion forming the space 21b are greatly deformed, and impact energy is absorbed.

In contrast, the power control unit 13 is surrounded by the upper reinforcement 22, which is a rigid body, and the rear portion of the front side frame 21. Thus, the power control unit 13 is protected from the impact load in the event of the full-wrap frontal collision.

A suspension arm (lower arm) 37 is supported on the outer side in the vehicle width direction of the lower side frame 32 so as to be swingable in the up-down direction. The suspension arm 37 cooperates with an upper arm (not illustrated) to suspend the front wheel Wf connected to the axle shaft 13d. The crash box 26, the front side frame 21, and the lower side frame 32 have the same width in the vehicle width direction.

Next, with reference to FIGS. 4A and 4B, a description will be given of an operation when an electric vehicle including such a front frame structure collides with a three-dimensional obstacle Ea in an event of a full-wrap frontal collision.

In the front frame structure according to this embodiment, the reconstructed front side frames 21 are disposed in the left and right extra spaces in the motor room 2. The front rigid frame 35 is disposed in the extra space in a front portion of the motor room 2. The lower surfaces of the front side frames 21 are coupled to the cradle 31, and the front surfaces of the front side frames 21 are coupled to the front rigid frame 35.

When a front surface of the traveling electric vehicle collides with the three-dimensional obstacle Ea in a full-wrap frontal collision, the impact load at that time is transmitted to the left and right crash boxes 26 via the bumper beam 27 provided laterally in the vehicle width direction.

Then, from an initial stage to a middle stage of the collision, as illustrated in FIG. 4A, the bumper beam 27 and the crash boxes 26 receive a reaction force from the front rigid frame 35, the bumper beam 27 is compressed and deformed, and the crash boxes 26 are axially crushed to absorb impact energy.

In a final stage of the collision after the crash boxes 26 are completely crushed, the impact load is transmitted to the vertical frames 35a as illustrated in FIG. 4B. The crash boxes 26 are coupled to the positions lower than the center in the up-down direction of the vertical frames 35a. The upper portions of the vertical frames 35a are inclined rearward of the vehicle body. The upper reinforcements 22 are coupled to the rear surface of the upper cross member 35b of the front rigid frame 35.

The vertical frames 35a receiving the impact load from the crash boxes 26 press front surfaces of the lower side frames 32 via the front cross member 35c. At the same time, the vertical frames 35a press the upper reinforcements 22 via the upper cross member 35b.

The upper reinforcements 22 each are a rigid body. Thus, even when the upper reinforcements 22 receive an impact load from the vertical frames 35a, the upper reinforcements 22 are not greatly compressed and deformed. Thus, the vertical frames 35a are deformed by the impact load in a counterclockwise direction in FIG. 4A with the upper cross member 35b side as a fulcrum.

Then, the front cross member 35c joined to lower ends of the vertical frames 35a applies a rearward and obliquely downward vector load to the lower side frames 32 of the cradle 31. As a result, the portions of the lower side frames 32 exposed to the spaces 21b are buckled by receiving the impact load from the vertical frames 35a.

In contrast, the front end lower portions 21a of the front side frames 21 substantially directly face the crash boxes 26. Thus, the impact load from the vertical frames 35a is applied to the front end lower portions 21a in a substantially horizontal direction. As a result, in the front end lower portions 21a, the impact load is concentrated on the ridge portions formed near the narrow portions 21d of the spaces 21b, and a trigger for deformation is given.

Then, the lower portions of the front end lower portions 21a are pressed rearward and deformed. Thereafter, the vertical frames 35a press the entire front surfaces of the front side frames 21 to deform the spaces 21b. The final impact load energy is absorbed by the deformation of the spaces 21b. At this time, since the rear portions of the front side frames 21 each are formed in a wall shape, the rear portions are less likely to be crushed even when the impact load is applied thereto. The posture of an upper portion of the front rigid frame 35 is substantially maintained by the reaction force from the upper reinforcements 22 each being a rigid body.

As a result, the power control unit 13 is protected from the impact load in the event of the full-wrap frontal collision by the rear portions of the front side frames 21 and the upper reinforcements 22. Since the final impact energy is absorbed by the deformation of the spaces 21b provided in front portions of the front side frames 21, it is possible to effectively protect the cabin 3 and the battery chamber 10 from the impact in the event of the collision.

Next, an operation when the electric vehicle collides with a columnar obstacle Eb such as a utility pole in an event of a small-overlap frontal collision will be described with reference to FIGS. 5A to 5C. In the following description, a case where a left end portion of a vehicle body front portion collides will be described as an example.

Both the end portions of the front cross member 35c of the cradle 31 protrude in the vehicle width direction within a range not exceeding the vehicle body width. The vertical frames 35a of the front rigid frame 35 are joined to the end portions of the front cross member 35c. The vertical frames 35a each are a hollow quadrangular prism formed in a trapezoidal shape in a front view with a wide base.

Figure 5A:
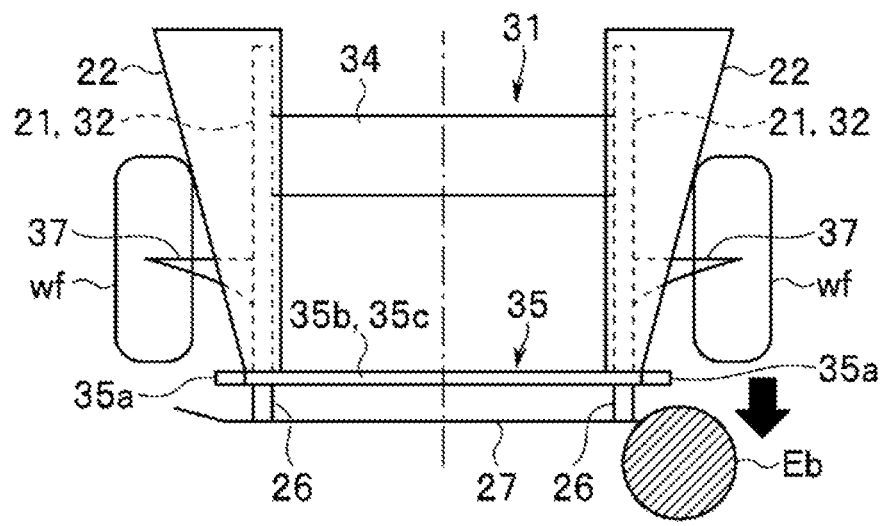
FIG. 5A is a plan view illustrating a behavior of a front frame in an initial stage of a small-overlap frontal collision.

When a left end portion of the bumper beam 27 provided in the electric vehicle collides with the columnar obstacle Eb in an event of a small-overlap frontal collision, the end portion of the bumper beam 27 is first bent by a reaction force that is received from the columnar obstacle Eb in an initial stage of the collision as illustrated in FIG. 5A. Then, when the electric vehicle further moves forward by the thrust of the vehicle, an end portion of the front cross member 35c and a lower portion of the vertical frame 35a collide with the columnar obstacle Eb.

Figure 5B:
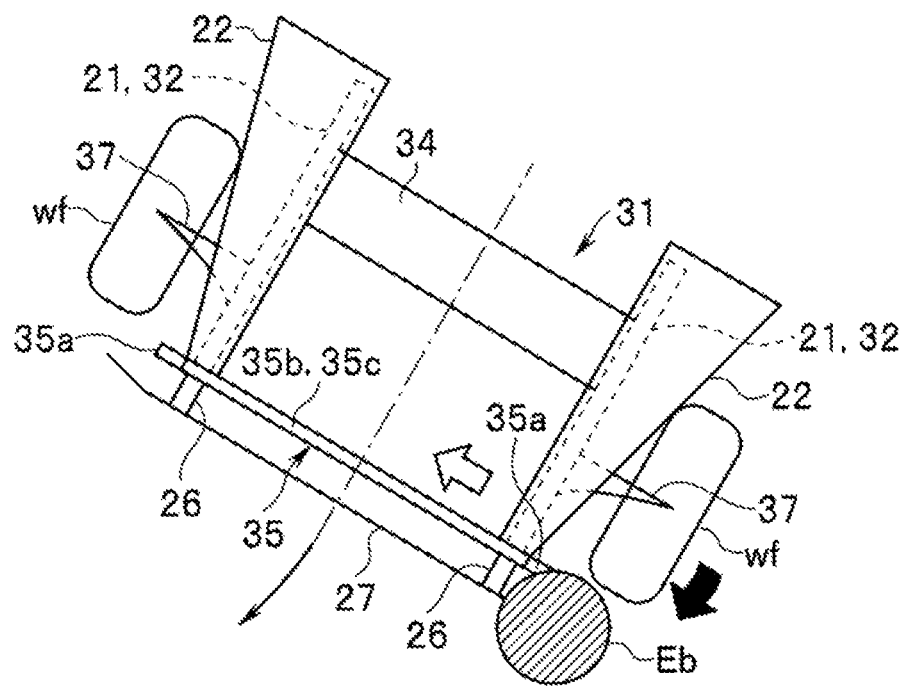
FIG. 5B is a plan view illustrating a behavior of the front frame in a middle stage of the small-overlap frontal collision.
Figure 5C:
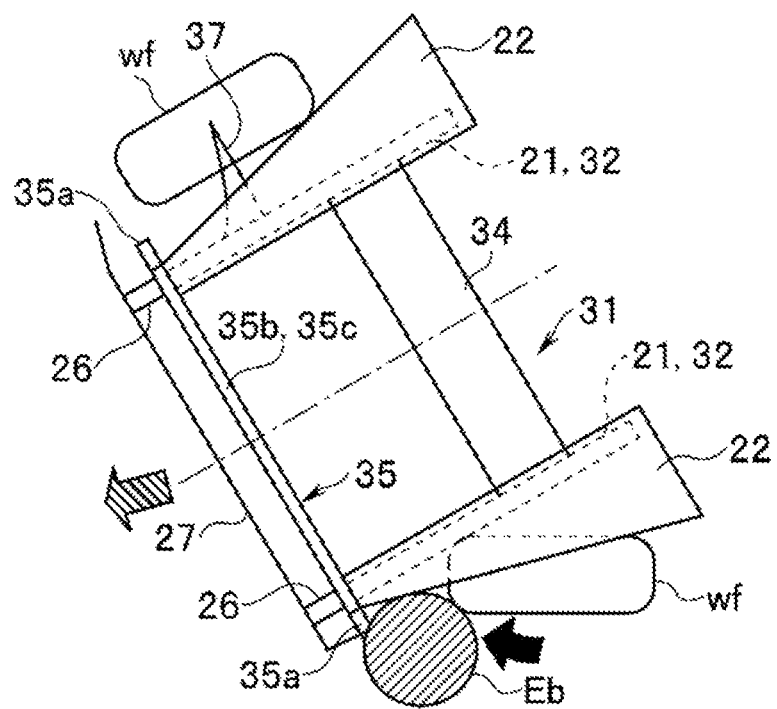
FIG. 5C is a plan view illustrating a behavior of the front frame in a final stage of the small-overlap frontal collision.

In a middle stage of the collision, as illustrated in FIG. 5B, the reaction force from the columnar obstacle Eb is applied to the lower portion of the vertical frame 35*a* and the front cross member 35*c* as illustrated by a white arrow due to the inertial force (black arrow) of the electric vehicle.

The front rigid frame 35 is a rigid body. Thus, the reaction force from the columnar obstacle Eb received by the lower portion of the vertical frame 35*a* and the end portion of the front cross member 35*c* is supported by the entire front rigid frame 35. As a result, clockwise yawing is generated in the electric vehicle. With this yawing, the impact energy in the event of the collision is converted into kinetic energy and attenuated (absorbed).

The multiple battery modules 11 accommodated in the battery chamber 10 provided in the electric vehicle are heavy objects. Thus, even in a final stage of the collision, in some cases, the impact energy is not converted into kinetic energy, and the inertial force may remain as indicated by a black arrow in FIG. 5C.

When the inertial force remains in the electric vehicle in the final stage of the collision, the columnar obstacle Eb comes into contact with the outer side surface on the distal end side of the upper reinforcement 22 in response to the yawing generated in the middle stage of the collision of the electric vehicle. The outer side surface of the upper reinforcement 22 gradually extends outward in the vehicle width direction from the front end toward the rear end of the upper reinforcement 22 so that the width of the upper reinforcement 22 increases. Thus, the electric vehicle rubs and passes the columnar obstacle Eb while the outer side surface of the upper reinforcement 22 with which the columnar obstacle Eb comes into contact serves as a guide, in the direction indicated by a hatching arrow in FIG. 5C.

The impact energy is attenuated by the drag when the electric vehicle rubs and passes the columnar obstacle Eb. As a result, the electric vehicle can effectively protect the power control unit 13, the cabin 3, and the battery chamber 10 from the impact load in the event of the collision even in the event of the small-overlap frontal collision.

As described above, in the front frame structure according to the present embodiment, the front side frames 21 are reconstructed in the left and right extra spaces in the motor room 2 based on the front frame structure that is used in the vehicle in which the conventional reciprocating engine is mounted.

As a result, it is easy to design a structure for efficiently absorbing impact energy in the extra spaces, and the power control unit 13 can be protected with a volume equivalent to that of a conventional engine room. Since the crush stroke can be ensured with the volume equivalent to that of the engine room of the vehicle in which the conventional reciprocating engine is mounted, the design is not impaired.

The front rigid frame 35 is disposed in the front portion of the motor room 2, and its lower end is joined to the front cross member 35*c* of the cradle 31 to form the frame-shaped structure. The lower portion of the vertical frame 35*a* and the outer side in the vehicle width direction of the front cross member 35*c* protrude forward of the front wheel Wf. In the event of the small-overlap collision, the lower portion of the vertical frame 35*a* and the front cross member 35*c* that protrude forward of the front wheel Wf collide with the columnar obstacle Eb. Accordingly, yawing is generated in the electric vehicle. With this yawing, the impact energy in the event of the collision is converted into kinetic energy and attenuated.

The upper reinforcement 22 is joined to the upper surface of the front side frame 21. The upper reinforcement 22 is formed so that the outer side surface thereof gradually protrudes outward in the vehicle width direction from the front end toward the rear end thereof. Even when not all the impact energy is converted into the kinetic energy by the yawing generated in the electric vehicle in the event of the small-overlap collision and the inertial force remains, the impact energy can be attenuated by the drag when the outer side surface of the upper reinforcement 22 rubs and passes the columnar obstacle Eb. As a result, the motor room 2, the cabin 3, and the battery chamber 10 can be effectively protected from the impact load in the event of the collision.

The disclosure is not limited to the above-described embodiment. For example, the disclosure may be applied to an offset frontal collision that is defined between a full-wrap frontal collision and a small-overlap frontal collision.

According to the embodiment of the disclosure, based on the front frame structure that is used in the vehicle in which the conventional reciprocating engine is mounted, the front side frames are disposed in the extra spaces between the side walls in the vehicle width direction of the motor room and the side surfaces of the power control unit, the frame-shaped rigid member is disposed in the extra space in the front portion of the motor room, the front side frames are coupled to the rear surface of the frame-shaped rigid member, and the impact absorbing members are coupled to the front surface of the frame-shaped rigid member.

Accordingly, the framework of the front frame structure can be easily reconstructed. Since the front side frames and the frame-shaped rigid member are disposed using the extra spaces, the power control unit, and the cabin or the battery chamber can be effectively protected from an impact load in an event of a full-wrap frontal collision without impairing the design.

Since the upper reinforcement is coupled to the upper surface of the front side frame and the outer side surface in the vehicle width direction of the upper reinforcement gradually protrudes outward in the vehicle width direction from the front end toward the rear end of the upper reinforcement, the outer side surface in the vehicle width direction of the upper reinforcement comes into contact with the columnar obstacle in an event of a small-overlap frontal collision. Accordingly, the electric vehicle can be made to rub and pass the obstacle using the outer side surface as a guide. Then, the impact energy can be attenuated by the drag when the electric vehicle rubs and passes the obstacle. As a result, even in an event of a small-overlap frontal collision, the electric vehicle can effectively protect the power control unit, the cabin, and the battery chamber from the impact load in the event of the collision.

The invention claimed is:
1. A front frame structure for an electric vehicle, the front frame structure comprising:
   front side frames disposed respectively in extra spaces between left and right side walls in a vehicle width direction of a motor room and side surfaces of a power control unit of the electric vehicle;
   a frame-shaped rigid member disposed in an extra space in a front portion of the motor room;
   left and right impact absorbing members coupled to a front surface of the frame-shaped rigid member at positions directly facing the front side frames;
   a bumper beam coupling the left and right impact absorbing members;
   a lower frame disposed in a lower portion of the motor room, both sides in the vehicle width direction of the lower frame being supported by the front side frames, the power control unit comprising an electric motor being supported on a rear portion of the lower frame; and upper reinforcements coupled to upper surfaces of the front side frames, wherein outer side surfaces in the vehicle width direction of the upper reinforcements gradually protrude outward in the vehicle width direction from front ends toward rear ends of the upper reinforcements in a front-rear direction of a vehicle body of the electric vehicle.

2. The front frame structure for the electric vehicle according to claim 1, wherein each of the front side frames has a wall shape having a dimension in a height direction from a bottom portion to an upper portion of the motor room, and wherein a front portion of each of the front side frames comprises a fragile portion on which a stress load in an event of a frontal collision of the electric vehicle is concentrated.

3. The front frame structure for the electric vehicle according to claim 2, wherein an upper portion of the frame-shaped rigid member is inclined rearward of the vehicle body.

4. The front frame structure for the electric vehicle according to claim 1, wherein the frame-shaped rigid member comprises left and right vertical frames and cross members coupling upper portions and lower portions of both the vertical frames, and wherein the front side frames, the left and right impact absorbing members, and front end surfaces of the upper reinforcements are coupled to the vertical frames.

5. The front frame structure for the electric vehicle according to claim 4, wherein each of the vertical frames is a trapezoidal quadrangular prism having a wide base, and a lower portion of each of the vertical frames, on an outer side in the vehicle width direction, protrudes forward of a front wheel of the electric vehicle.

6. The front frame structure for the electric vehicle according to claim 5, wherein an upper portion of the frame-shaped rigid member is inclined rearward of the vehicle body.

7. The front frame structure for the electric vehicle according to claim 4, wherein an upper portion of the frame-shaped rigid member is inclined rearward of the vehicle body.

8. The front frame structure for the electric vehicle according to claim 1, wherein an upper portion of the frame-shaped rigid member is inclined rearward of the vehicle body.

* * * * *